(12) United States Patent
Malek et al.

(10) Patent No.: US 11,149,774 B2
(45) Date of Patent: Oct. 19, 2021

(54) BATHTUB FASTENER ASSEMBLY

(71) Applicant: Newfrey LLC, New Britain, CT (US)

(72) Inventors: Collin J. Malek, Rochester Hills, MI (US); Oday Amer Safry, Farmington Hills, MI (US); Roger E. Pilon, New Baltimore, MI (US)

(73) Assignee: Newfrey LLC, New Britain, CT (US)

( * ) Notice: Subject to any disclaimer, the term of this patent is extended or adjusted under 35 U.S.C. 154(b) by 91 days.

(21) Appl. No.: 16/592,307

(22) Filed: Oct. 3, 2019

(65) Prior Publication Data
US 2021/0102568 A1 Apr. 8, 2021

(51) Int. Cl.
*F16B 5/06* (2006.01)
*F16B 21/07* (2006.01)

(52) U.S. Cl.
CPC ............ *F16B 21/075* (2013.01); *F16B 5/065* (2013.01); *F16B 5/0614* (2013.01); *F16B 5/0657* (2013.01)

(58) Field of Classification Search
CPC ...... F16B 21/075; F16B 5/0614; F16B 5/065; F16B 5/0657
See application file for complete search history.

(56) References Cited

U.S. PATENT DOCUMENTS

| | | | | |
|---|---|---|---|---|
| 4,865,505 A | * | 9/1989 | Okada | B60N 3/046 411/512 |
| 5,533,237 A | * | 7/1996 | Higgins | F16B 5/065 24/289 |
| 5,542,158 A | * | 8/1996 | Gronau | F16B 5/065 24/289 |
| 5,966,782 A | * | 10/1999 | Ishihara | F16B 5/0614 24/289 |
| 6,074,150 A | * | 6/2000 | Shinozaki | B60R 13/0206 24/297 |

(Continued)

FOREIGN PATENT DOCUMENTS

| | | |
|---|---|---|
| EP | 3557086 A1 | 10/2019 |
| FR | 3028577 A1 | 5/2016 |
| WO | WO 2018/080610 A1 | 5/2018 |

OTHER PUBLICATIONS

Fastener Assembly drawing, Part #13772 (1989).

(Continued)

*Primary Examiner* — Jason W San
(74) *Attorney, Agent, or Firm* — Harness, Dickey & Pierce, P.L.C.

(57) ABSTRACT

A bathtub component includes a structural plastic part and a plurality of separate flexible seal parts integrated together. Each of two tub side walls of a structural plastic part can have an aperture retention tab extending exteriorly therefrom. Openings in the structural plastic part on lateral sides of the aperture retention tabs are each sealed with a separate flexible seal part. Another separate flexible seal part can form an umbrella seal. A U-base clip component includes a rib retention protrusion and can extend interiorly from clip side walls into a rib receiving cavity the U-base clip component. The U-base clip component is received in an interior clip receiving cavity of the bathtub component. Clip retention protrusions can extend from the structural plastic part into a clip receiving cavity to engage apertures in the clip side walls to releasably couple the bathtub and U-base clip components together.

20 Claims, 12 Drawing Sheets

(56) References Cited

U.S. PATENT DOCUMENTS

| | | |
|---|---|---|
| 6,244,805 B1 | 6/2001 | Everard |
| 6,279,207 B1 | 8/2001 | Vassiliou |
| 6,381,811 B2 | 5/2002 | Smith et al. |
| 6,438,804 B1 * | 8/2002 | Romero Magarino ...................... B60R 13/0212 24/289 |
| 6,449,814 B1 | 9/2002 | Dinsmore et al. |
| 6,474,616 B2 | 11/2002 | Yamada et al. |
| 6,497,011 B2 | 12/2002 | Smith et al. |
| 6,527,471 B2 * | 3/2003 | Smith ....................... F16B 2/20 403/291 |
| 6,648,542 B2 | 11/2003 | Smith et al. |
| 6,665,914 B2 | 12/2003 | Ogawa |
| 6,718,599 B2 | 4/2004 | Dickinson et al. |
| 6,796,006 B2 | 9/2004 | Hansen |
| 6,846,125 B2 | 1/2005 | Smith et al. |
| 6,928,705 B2 | 8/2005 | Osterland et al. |
| 7,051,408 B2 | 5/2006 | De Azevedo et al. |
| 7,096,638 B2 | 8/2006 | Osterland et al. |
| 7,120,971 B2 | 10/2006 | Osterland et al. |
| 7,134,170 B2 | 11/2006 | Gibbons et al. |
| 7,186,051 B2 | 3/2007 | Benedetti et al. |
| 7,188,392 B2 | 3/2007 | Giugliano et al. |
| 7,204,000 B2 | 4/2007 | Benedetti et al. |
| 7,231,696 B2 | 6/2007 | Asano et al. |
| 7,272,873 B2 | 9/2007 | Nessel et al. |
| 7,287,945 B2 * | 10/2007 | Lubera .................... F16B 5/065 24/295 |
| 7,356,886 B2 | 4/2008 | Okada |
| 7,364,382 B2 | 4/2008 | Benedetti et al. |
| 7,399,151 B2 | 7/2008 | Lubera et al. |
| 7,552,516 B2 * | 6/2009 | Okada ................... F16B 5/0628 24/297 |
| 7,640,634 B2 | 1/2010 | Vassiliou |
| 7,725,991 B2 | 6/2010 | Lubera et al. |
| 7,740,432 B2 | 6/2010 | Harada |
| 7,784,159 B2 | 8/2010 | Dickinson et al. |
| 7,862,273 B2 | 1/2011 | Ooyama et al. |
| 8,051,539 B2 | 11/2011 | Benedetti et al. |
| 8,496,420 B2 * | 7/2013 | Aoki ..................... F16B 5/0642 411/45 |
| 8,528,295 B2 | 9/2013 | Glynn et al. |
| 8,567,017 B2 | 10/2013 | Iwahara et al. |
| 8,627,552 B2 | 1/2014 | Smith et al. |
| 8,793,845 B2 | 8/2014 | Benedetti et al. |
| 8,904,607 B2 | 12/2014 | Diez Herrera |
| 8,950,043 B2 | 2/2015 | Hofmann et al. |
| 9,003,616 B2 | 4/2015 | Choi |
| 9,080,588 B2 | 7/2015 | Diez Herrera et al. |
| D767,372 S * | 9/2016 | Itou ........................ H02G 3/26 D8/356 |
| 9,630,572 B2 | 4/2017 | Iwahara et al. |
| 9,649,993 B1 | 5/2017 | Dickinson et al. |
| 9,981,614 B2 | 5/2018 | Mingerink et al. |
| 10,030,684 B2 | 7/2018 | Paquet |
| 10,227,025 B2 | 3/2019 | Tamai et al. |
| 10,288,098 B2 * | 5/2019 | Meyers ................. F16B 5/0628 |
| 10,336,265 B2 | 7/2019 | Dickinson et al. |
| 10,408,248 B1 * | 9/2019 | Safry .................... F16B 5/0628 |
| 10,590,968 B2 * | 3/2020 | Benedetti ............. F16B 21/075 |
| 10,634,176 B2 * | 4/2020 | Dickinson ............. F16B 5/0614 |
| 10,894,516 B2 * | 1/2021 | Benedetti ................ F16B 2/243 |
| 2004/0083582 A1 * | 5/2004 | Dickinson ............. F16B 21/075 24/295 |
| 2006/0168773 A1 * | 8/2006 | Smith ................... F16B 21/075 24/295 |
| 2012/0311829 A1 | 12/2012 | Dickinson et al. |
| 2013/0340216 A1 | 12/2013 | Smith et al. |
| 2015/0076304 A1 | 3/2015 | Hattori |
| 2015/0211565 A1 | 6/2015 | Benedetti |
| 2015/0321622 A1 | 11/2015 | Dickinson et al. |
| 2019/0017527 A1 | 1/2019 | Dickinson |
| 2019/0048907 A1 | 2/2019 | Sugiyama |
| 2019/0048911 A1 | 2/2019 | Bidlake et al. |
| 2019/0111857 A1 | 4/2019 | Benedettil et al. |
| 2019/0170178 A1 | 6/2019 | Leverger et al. |
| 2019/0195262 A1 | 6/2019 | Iwahara et al. |
| 2019/0331148 A1 * | 10/2019 | De Jong ............... F16B 5/0657 |

OTHER PUBLICATIONS

Fastener Assembly drawing, Part #14788 (1992).
Fastener Assembly drawing, Part #14789 (1992).
Extended European Search Report dated Feb. 19, 2021 in corresponding European Patent Application No. 20197103.3.
Drawings of Stanley Engineered Fastening/Newfrey, Part # 72350-00, having a date of Apr. 15, 2019.
Drawings of Stanley Engineered Fastening/Newfrey, Part # 71975-00, having a date prior to Apr. 15, 2019 (typically combined with an inner metal clip).
Drawings of Stanley Engineered Fastening/Newfrey, Part # 71861-01, having a date of Jan. 20, 2017 (typically combined with an inner metal clip).
Drawings of Stanley Engineered Fastening/Newfrey, Part # X9081-C, having an unknown date.
Drawings of Stanley Engineered Fastening/Newfrey, Part # 71819-00, having a date prior to Jan. 20, 2017.
Drawings of Stanley Engineered Fastening/Newfrey, Part # 71198-00, having a date of Oct. 23, 2013.

* cited by examiner

BATHTUB FASTENER ASSEMBLY

FIELD

The present disclosure relates to a bathtub fastener assembly, which includes a bathtub component and a clip component, and which is designed to couple a first component having an aperture therethrough to a second component having a rib extending therefrom.

BACKGROUND

This section provides background information related to the present disclosure which is not necessarily prior art.

Bathtub fastener assemblies are sometimes used to provide water and dirt intrusion where an aperture component is coupled to a ribbed component. Such bathtub fastener assemblies generally include a bathtub component and a metal clip component. Typically, the metal clips used in such assemblies must be specially designed, and require specially designed ribs. This increases the manufacturing, assembly, and related costs of using such bathtub fastener assemblies. In addition, the bathtub component typically includes a one-piece plastic part and a one-piece sealing part integrated together. This requires balancing the use of the one-piece plastic and sealing parts that can have negative effects on the costs and performance as well.

SUMMARY

This section provides a general summary of the disclosure, and is not a comprehensive disclosure of its full scope or all of its features.

In accordance with one aspect of the present disclosure, a bathtub fastener assembly designed to couple a first component having an aperture therethrough to a second component having a rib extending therefrom is provided. The bathtub fastener assembly can include a bathtub component including a structural plastic part and a plurality of separate flexible seal parts. Each of the separate flexible seal parts can be integrated together with the structural plastic part. The structural plastic part can include a head and a tub body extending from the head. The tub body can have two tub side walls connected at a tub insertion end with an interior clip receiving cavity between the two opposing side walls. Each of the two tub side walls can have an aperture retention tab extending exteriorly therefrom and designed to retain the bathtub component in the aperture of the first component when inserted therein. The structural plastic part can include openings on lateral sides of the aperture retention tabs designed to allow the aperture retention tabs to flex inwardly during insertion of the bathtub component into the aperture of the first component. The plurality of separate flexible seal parts can include a separate flexible seal part forming an umbrella seal extending from the head, and a pair of separate flexible seal parts sealing the openings, respectively, on the lateral sides of the aperture retention tabs. A U-base clip component can include two clip side walls connected at a clip insertion end with a rib receiving cavity between the two clip side walls. A rib retention protrusion can extend interiorly into the rib receiving cavity and can be designed to retain the rib in the rib receiving cavity of the U-base clip when inserted therein, and the U-base clip component is received in the interior clip receiving cavity and is coupled to the bathtub component.

In accordance with another aspect of the present disclosure, a bathtub fastener assembly designed to couple a first component having an aperture therethrough to a second component having a rib extending therefrom is provided. The bathtub fastener assembly can include a structural plastic part and a plurality of separate flexible seal parts. Each of the plurality of separate flexible seal parts can be separately integrated together with the structural plastic part. The structural plastic part can include a head and a tub body extending from the head. The tub body can have two tub side walls connected at a tub insertion end with an interior clip receiving cavity between the two tub side walls. Each of the two tub side walls can have an aperture retention tab extending exteriorly therefrom and designed to retain the bathtub component in the aperture of the first component when inserted therein. The aperture retention tabs of the structural plastic part can be connected to the tub side walls, respectively, at both an insertion end and a trailing end of the aperture retention tabs. The structural plastic part can include openings in the two tub side walls on lateral sides of the aperture retention tabs designed to allow the aperture retention tabs to flex inwardly relative to the tub side walls, respectively, during insertion of the bathtub component into the aperture of the first component. Clip retention protrusions can extend from the two tub side walls into the interior clip receiving cavity. The plurality of separate flexible seal parts can include a separate flexible seal part forming an umbrella seal extending from the head and a pair of separate flexible seal parts sealing the openings, respectively, on the lateral sides of each of the aperture retention tabs. A U-base clip component can include two clip side walls connected at a clip insertion end with a rib receiving cavity between the two clip side walls. Rib retention barbs can extend interiorly from the two clip side walls into the rib receiving cavity and designed to retain the rib in the rib receiving cavity of the U-base clip when inserted therein. The two clip side walls of the U-base clip can include clip retention apertures cooperating with the clip retention protrusions to couple the U-base clip within the clip receiving cavity to the bathtub component.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
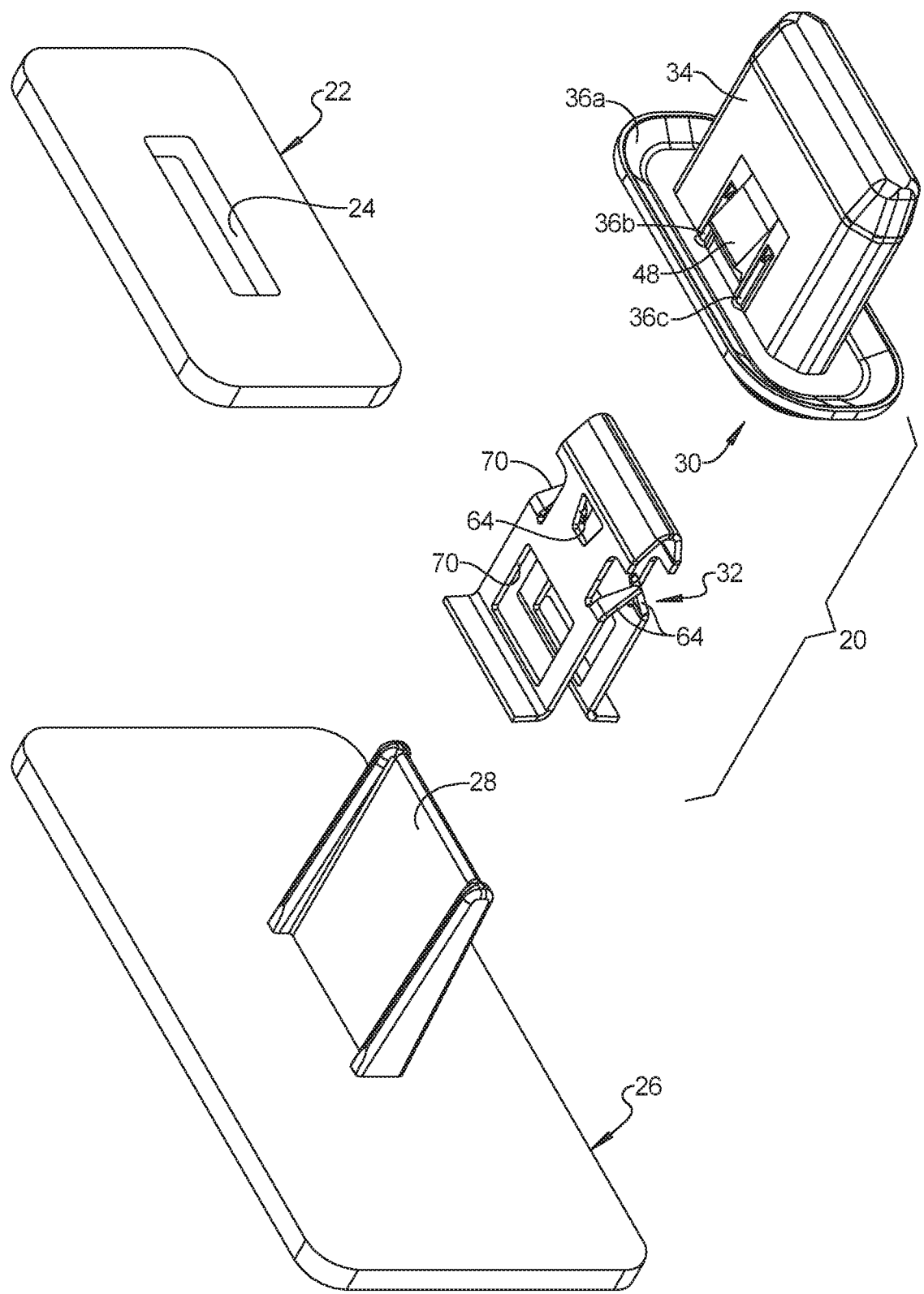
FIG. 1 is an exploded view of an example of a bathtub fastener assembly in accordance with the present disclosure, plus the apertured and ribbed components.
Figure 2:
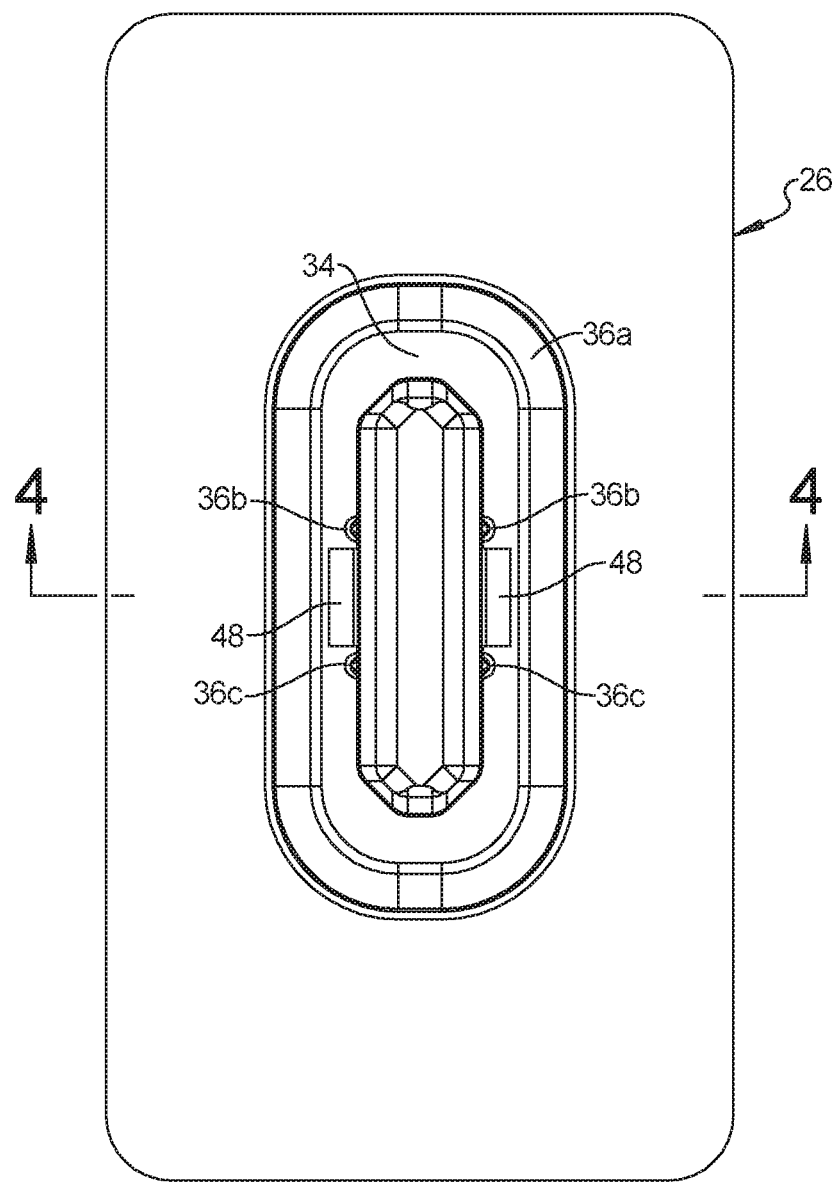
FIG. 2 is a bottom plan view of the example bathtub fastener assembly of FIG. 1, coupled to the ribbed component.
Figure 3:
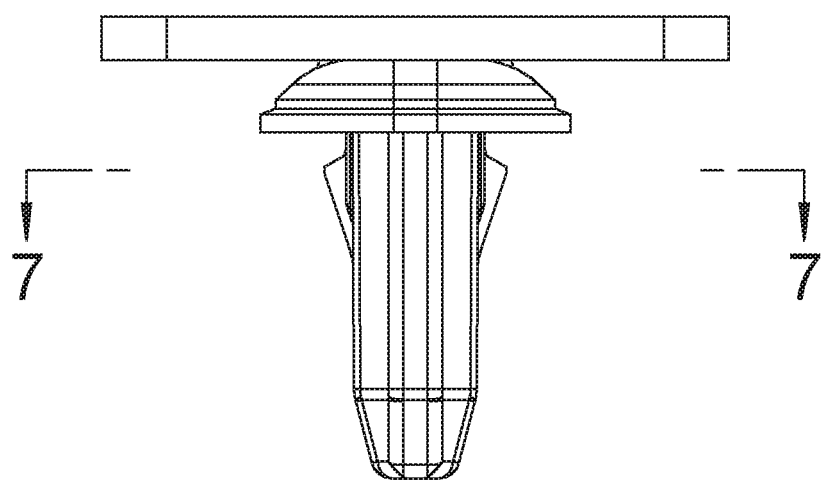
FIG. 3 is a side elevation view looking at a lateral end of the example bathtub fastener assembly of FIG. 1, coupled to the ribbed component.
Figure 4:
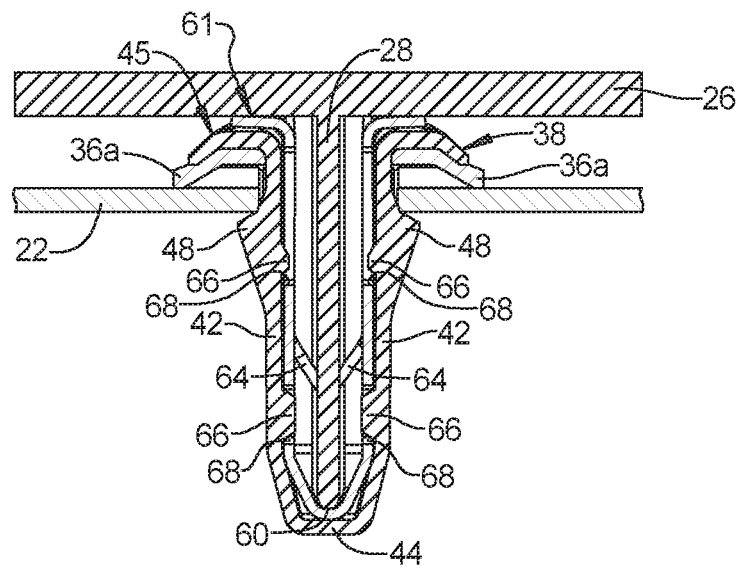
FIG. 4 is a cross-section view of the example bathtub fastener assembly of FIG. 1 taken along line 4-4 of FIG. 2, coupled to both the apertured and ribbed components.
Figure 5:
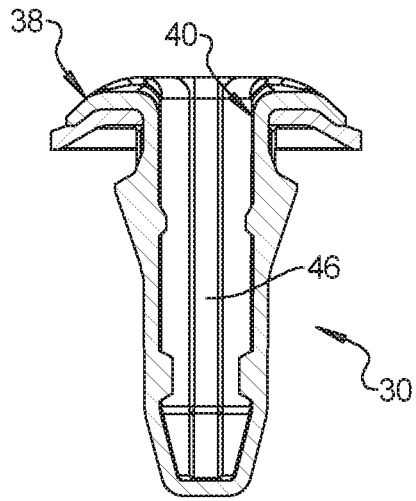
FIG. 5 is a cross-section view similar to FIG. 4, but showing only the bathtub component of FIG. 4.
Figure 6:
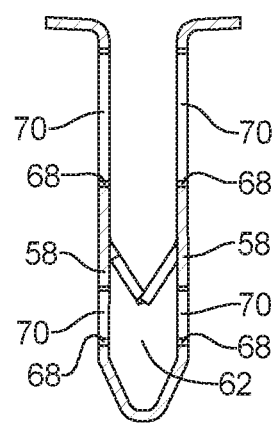
FIG. 6 is a cross-section view similar to FIG. 4, but showing only the U-base clip component of FIG. 4.
Figure 7:
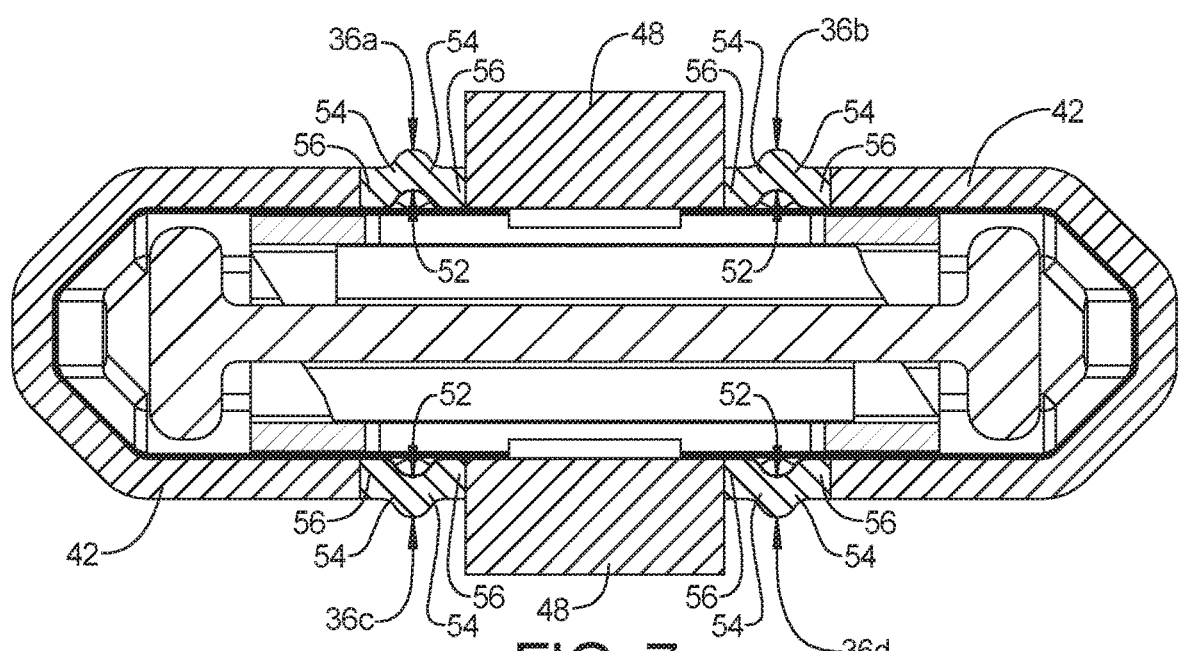
FIG. 7 is a cross-section view of the example bathtub fastener assembly of FIG. 1 taken along line 7-7 of FIG. 3.
Figure 8:
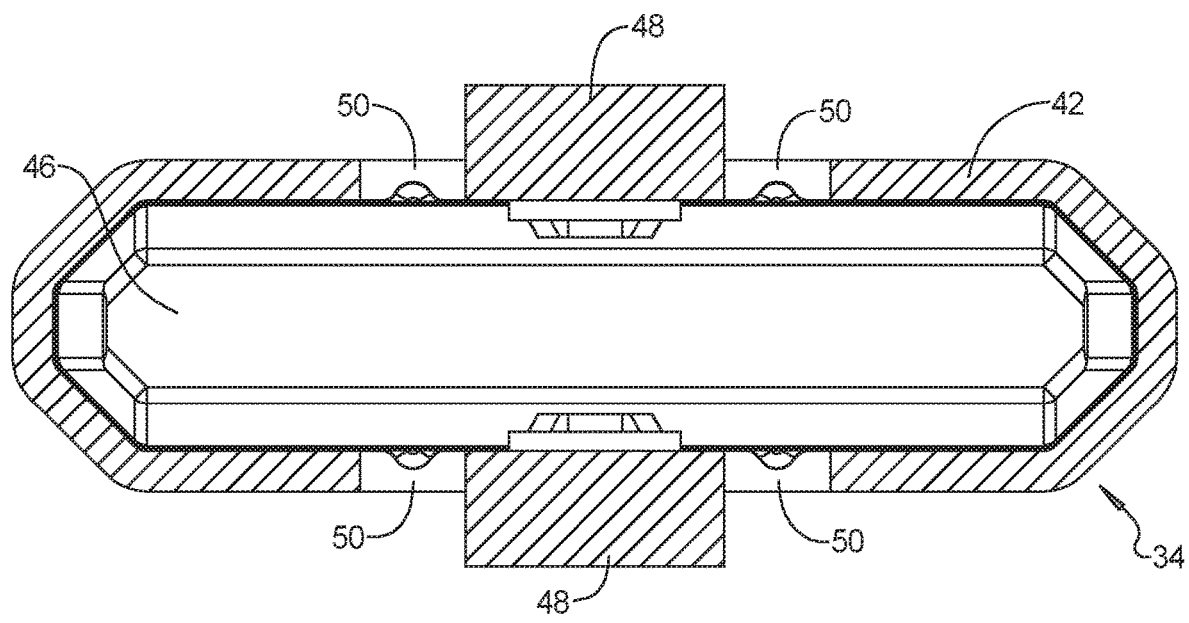
FIG. 8 is a cross-section view similar to FIG. 7, but showing only the structural plastic part of the bathtub component of FIG. 7.
Figure 9:
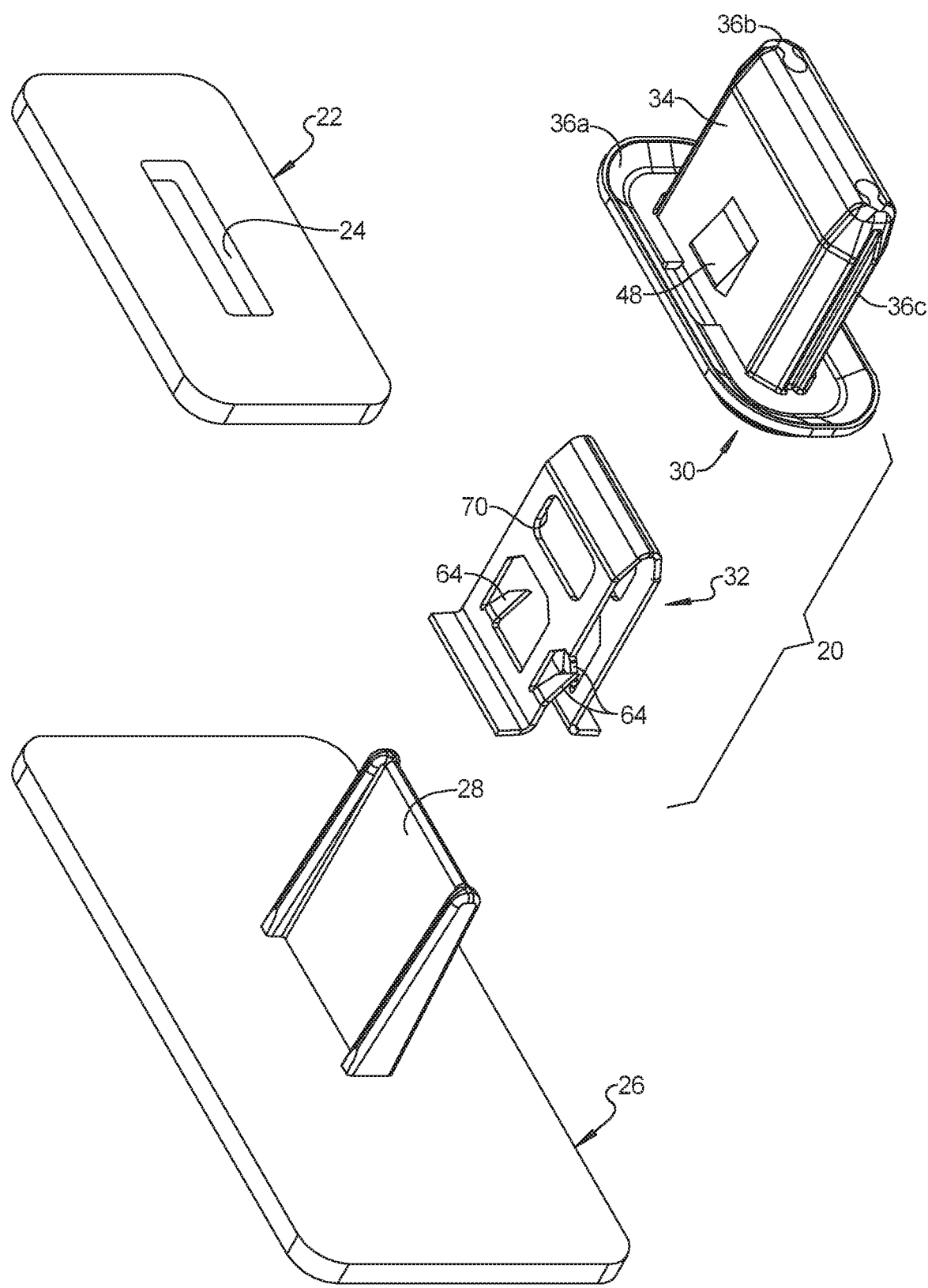
FIG. 9 is an exploded view of an example of another bathtub fastener assembly in accordance with the present disclosure, plus the apertured and ribbed components.
Figure 10:
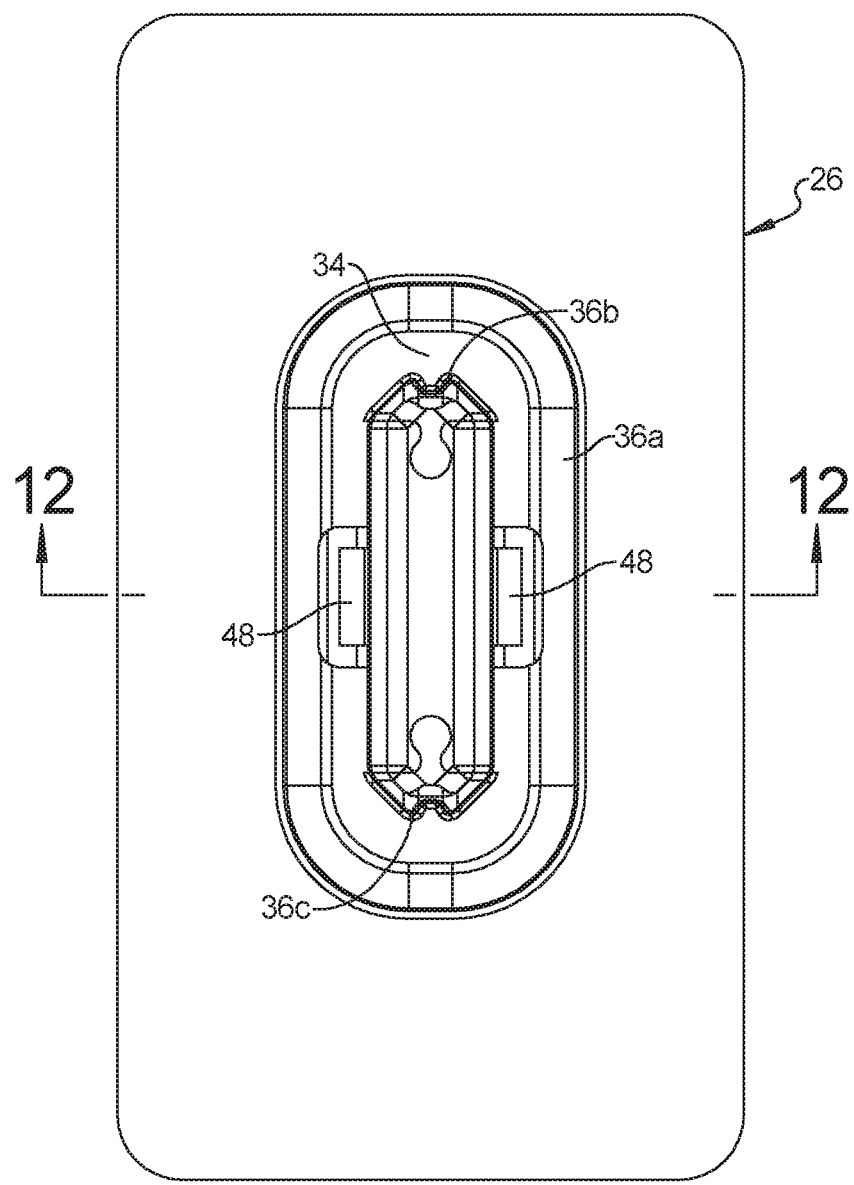
FIG. 10 is a bottom plan view of the example bathtub fastener assembly of FIG. 9, coupled to the ribbed component.

Example embodiments will now be described more fully with reference to the accompanying drawings.

Referring to FIGS. 1-8, one example of a bathtub fastener assembly 20 in accordance with the present disclosure is illustrated and described below. The bathtub fastener assemblies 20 in accordance with the present disclosure are designed to couple a first component 22 having an aperture 24 therethrough to a second component 26 having a rib 28 extending therefrom. The bathtub fastener assembly 20 generally includes a bathtub component 30 and a U-base clip component 32.

The bathtub component 30 includes a structural plastic part 34 and a plurality of separate flexible seal parts 36a, 36b, 36c. Each of the separate flexible seal parts 36a, 36b, 36c are independently integrated together with the structural plastic part 34. This can be accomplished, for example, using a two-shot molding process. The structural plastic part 34 can include a head 38 and a tub body 40 extending from the head 38. The tub body 40 includes two tub side walls 42 opposite each other and connected at an insertion end 44 with an interior clip receiving cavity 46 between the two tub side walls 42. Each of the two tub side walls 42 have an aperture retention tab 48 extending exteriorly from the respective tub side wall 42. The aperture retention tabs 48 are designed to retain the bathtub component 30 in the aperture 24 of the first component 22 when the bathtub component 30 is inserted in the aperture 24. As in this example, the aperture retention tabs 48 can be connected to the tub side walls 42, respectively, both at the insertion end of the aperture retention tab 48 (facing toward tub insertion end 44) and at the trailing end of the aperture retention tab 48 (facing toward tub trailing end 45).

The structural plastic part 34 includes a separate opening 50 (FIG. 8) on each lateral side of the aperture retention tabs 48. The openings 50 are designed to allow the aperture retention tabs 48 to flex inwardly during insertion of the bathtub component 30 into the aperture 24 of the first component 22. As in this example, the openings 50 can be positioned in the two opposite tub side walls 42 of the structural plastic part 34. The openings 50 in the tub side walls 42 can be positioned adjacent each lateral side of each aperture retention tab 48. The openings 50 can be designed to allow the aperture retention tabs 48 to flex inwardly relative to the tub side walls 42, respectively.

The plurality of separate flexible seal parts 36a, 36b, 36c can include a separate flexible seal part 36a that forms an umbrella seal extending from the head 38. The umbrella flexible seal part 36a can be coupled to and extend from the bottom of the head 38. This can enable use of a sealing material that is softer, thinner, or both, because the head 38 resists inversion of the umbrella seal part 36a.

The plurality of separate seal parts can also include at least a pair of separate flexible seal parts 36b, 36c that seal the openings 50, respectively, on the lateral sides of the retention tabs. As in this embodiment, the number of openings 50 and flexible seal parts 36b, 36c sealing the openings 50, respectively, can total four. The pair of separate flexible seal parts 36b, 36c that seal the openings 50 can have a central U-shaped portion 52 and can have a flange portion 56 extending outwardly from each leg 54 of the central U-shaped portion 52 taken perpendicular to the longitudinal insertion and removal direction as shown, e.g., along line 7-7 of FIG. 3 (referred to herein as a "flanged U-shape in cross-section"). As in this example, the flange portions 56 of each of the pair of separate flexible seal parts 36b, 36c can be planar. The planar flange portions 56 can extend in alignment with each other. The planar flange portions 56 can extend in alignment with the side wall 42 in which the openings 50 are positioned.

The U-base clip component 32 includes two clip side walls 58 opposite each other and connected at a clip insertion end 60 with a rib receiving cavity 62 between the two clip side walls 58. Rib retention protrusions 64 can extend interiorly from the two clip side walls 58 into the rib receiving cavity 62. The rib retention protrusions 64 are designed to retain the rib 28 in the rib receiving cavity 62 of the U-base clip component 32 when inserted therein. As in this example, the rib retention protrusions 64 can be rib retention barbs 64. The rib retention protrusions 64 can extend from both of the clip side walls 58.

When assembled together, the U-base clip component 32 and the bathtub component 30 are coupled together with the U-base clip component 32 inserted or received in the interior clip receiving cavity 46 of the bathtub component 30. For example, the clip retention protrusions 66 can extend from the two tub side walls 42 into the interior clip receiving cavity 46. The two clip side walls 58 of the U-base clip component 32 can include cooperating clip retention surfaces 68, which the clip retention protrusions 66 engage to couple the U-base clip component 32 and the bathtub component 30 together. As in this example, the opposite clip side walls 58 can include clip retention apertures 70 that provide the clip retention surfaces 68 and the clip retention protrusions 66 can extend into the clip retention apertures 70. The clip retention apertures 70 can facilitate inward movement of the aperture retention tabs 48, during insertion. Both clip side walls 58 and both tub side walls 42 can include the clip retention surfaces 68 and the clip retention protrusions 66, respectively.

As in this example, a pair of clip retention protrusions 66 can be positioned on the two tub side walls 42 opposite the aperture retention tabs 48, respectively. In such a case, the clip retention apertures 70 also include a curved upper engagement surface as seen, for example, in FIG. 5, causing the aperture retention tabs 48 to remain slightly inwardly disposed when retaining the aperture 24 and increasing the retention clip force provided by the engagement of the clip retention surfaces 68 and the clip retention protrusions 66. Additionally or alternatively, a pair of clip retention protrusions 66 can be positioned adjacent the tub trailing end 45. Additionally or alternatively, a pair of clip retention protrusions 66 can be positioned between the aperture retention tabs 48 and the tub insertion end 44. Additionally or alternatively, a pair of clip retention protrusions 66 can be positioned adjacent the tub insertion end 45.

Turning to the rib retention protrusions 64, as in this example, the rib retention protrusions 64 can be positioned adjacent the tub insertion end 44 or the clip insertion end 60. The rib retention protrusions 64 can be positioned between the aperture retention tabs 48 and the tub insertion end 44 or the clip insertion end 60. A pair of rib retention protrusions or barbs 64 can be positioned between the tub trailing end 45 or clip trailing end 61 and a pair of clip retention protrusions 66 adjacent the tub insertion end 44. A pair of rib retention protrusions 64 can be positioned between a pair of clip retention protrusions 66 adjacent the tub insertion end 44 and a pair of clip retention protrusions 66 adjacent the tub trailing end 45.

Referring to FIGS. 9-16, another example of a bathtub fastener assembly 20 in accordance with the present disclosure is illustrated and described herein. The same reference numbers are used herein to identify and describe corresponding elements or features in each of the various example embodiments of this disclosure, even if the corresponding elements or features are not identical. In addition, the descriptions of various corresponding elements or features previously provided may not be duplicated herein, despite its applicability to other example embodiments, to reduce or avoid unnecessary repetition thereof.

As in this example bathtub fastener assembly 20, the aperture retention tabs 48 can be connected to the tub side walls 42 around the entire periphery or along every side, including the lateral sides, of the retention tabs 48. The separate openings 50 (FIG. 16) on each lateral side of the aperture retention tabs 48 can be positioned to extend between the two tub side walls 42 at the lateral ends of the structural plastic part 34. As in this embodiment, the number of openings 50 and flexible seal parts 36b, 36c sealing the openings 50, respectively, can total two. The openings 50 can be designed to allow the aperture retention tabs 48 to flex inwardly along with the tub side walls 42, respectively, during insertion of the bathtub component 30 into the aperture 24 of the first component 22. In other words, the flexing movement of the tub side walls 42 toward each other facilitated by these lateral end openings 50 provides the inward flex of the aperture retention tables 48.

Figure 11:
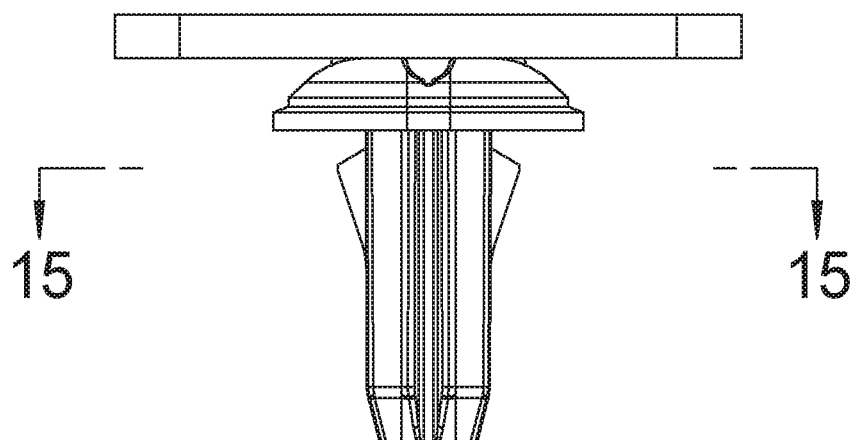
FIG. 11 is a side elevation view looking at a lateral end of the example bathtub fastener assembly of FIG. 9, coupled to the ribbed component.
Figure 12:
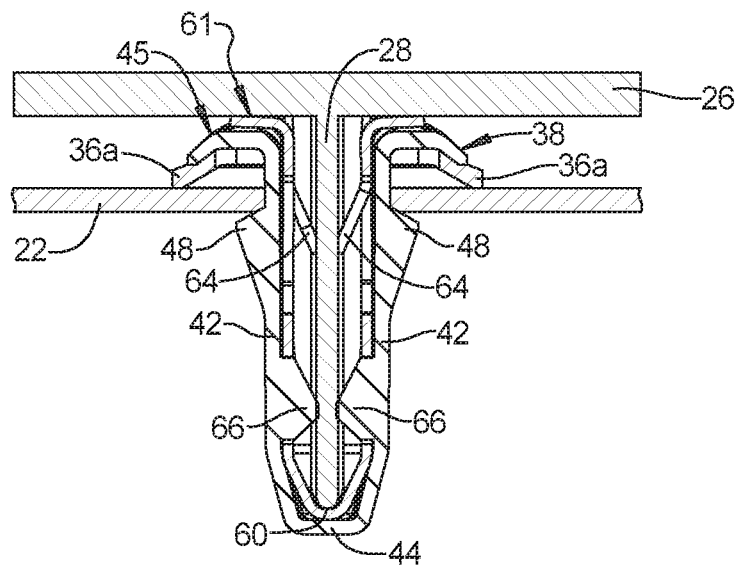
FIG. 12 is a cross-section view of the example bathtub fastener assembly of FIG. 9 taken along line 12-12 of FIG. 10, coupled to both the apertured and ribbed components.
Figure 13:
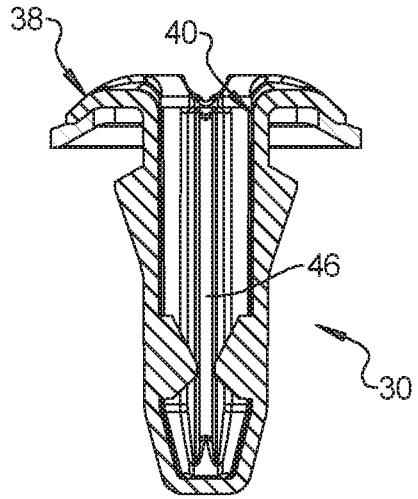
FIG. 13 is a cross-section view similar to FIG. 12, but showing only the bathtub component of FIG. 12.
Figure 14:
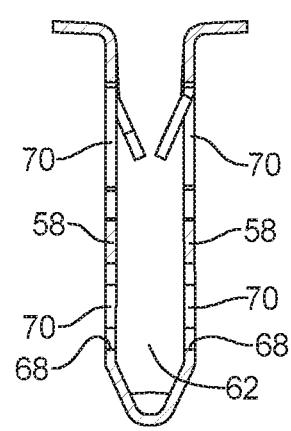
FIG. 14 is a cross-section view similar to FIG. 12, but showing only the U-base clip component of FIG. 12.
Figure 15:
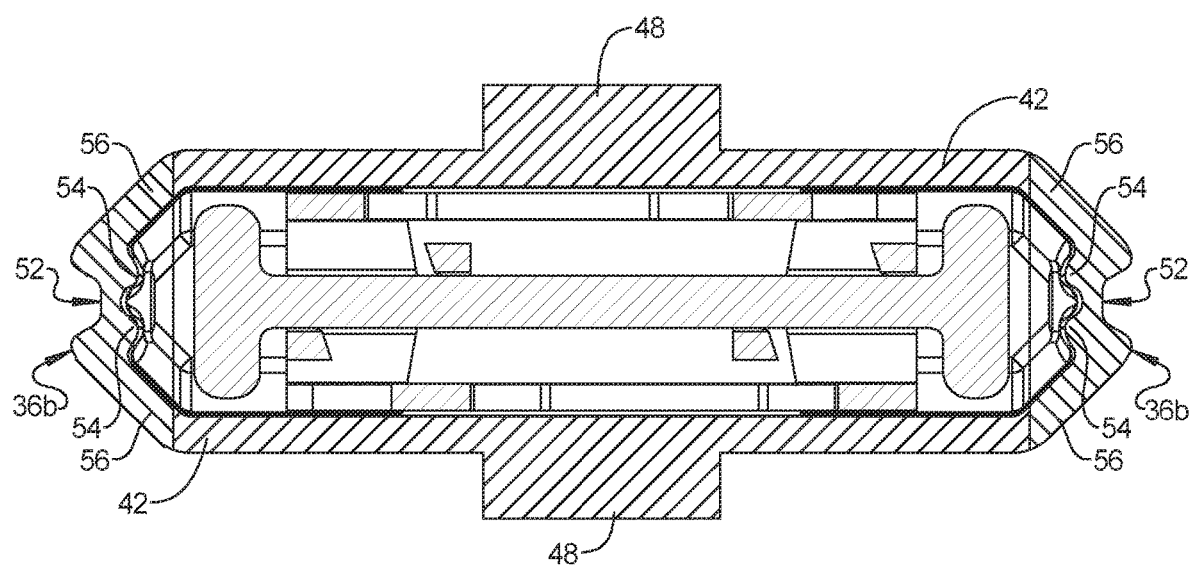
FIG. 15 is a cross-section view of the example bathtub fastener assembly of FIG. 1 taken along line 15-15 of FIG. 11.
Figure 16:
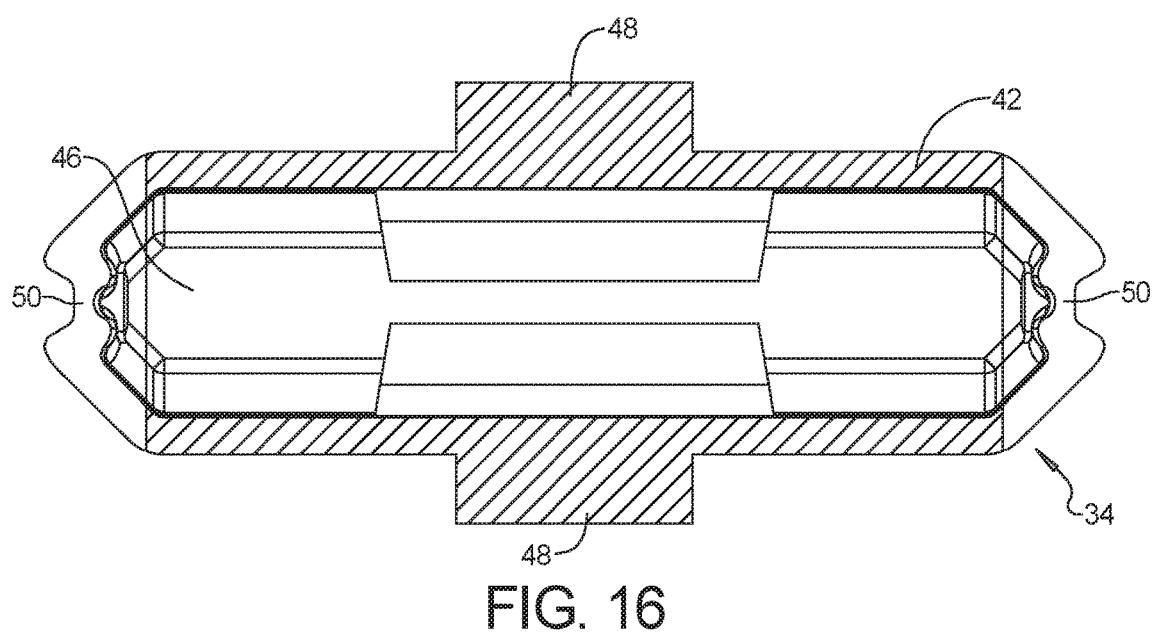
FIG. 16 is a cross-section view similar to FIG. 15, but showing only the structural plastic part of the bathtub component of FIG. 15.
Figure 17:
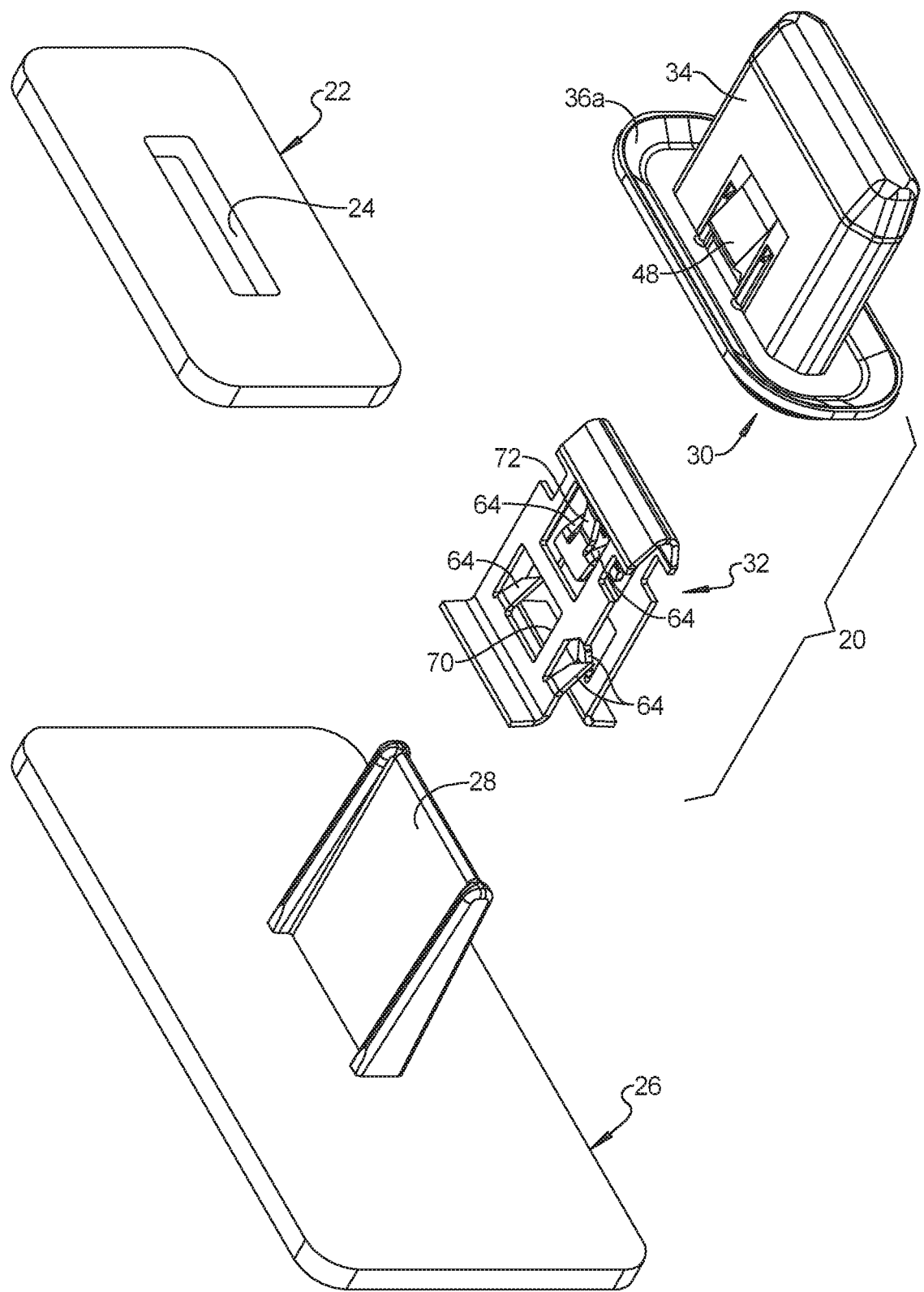
FIG. 17 is an exploded view of an example of another bathtub fastener assembly in accordance with the present disclosure, plus the apertured and ribbed components.
Figure 18:
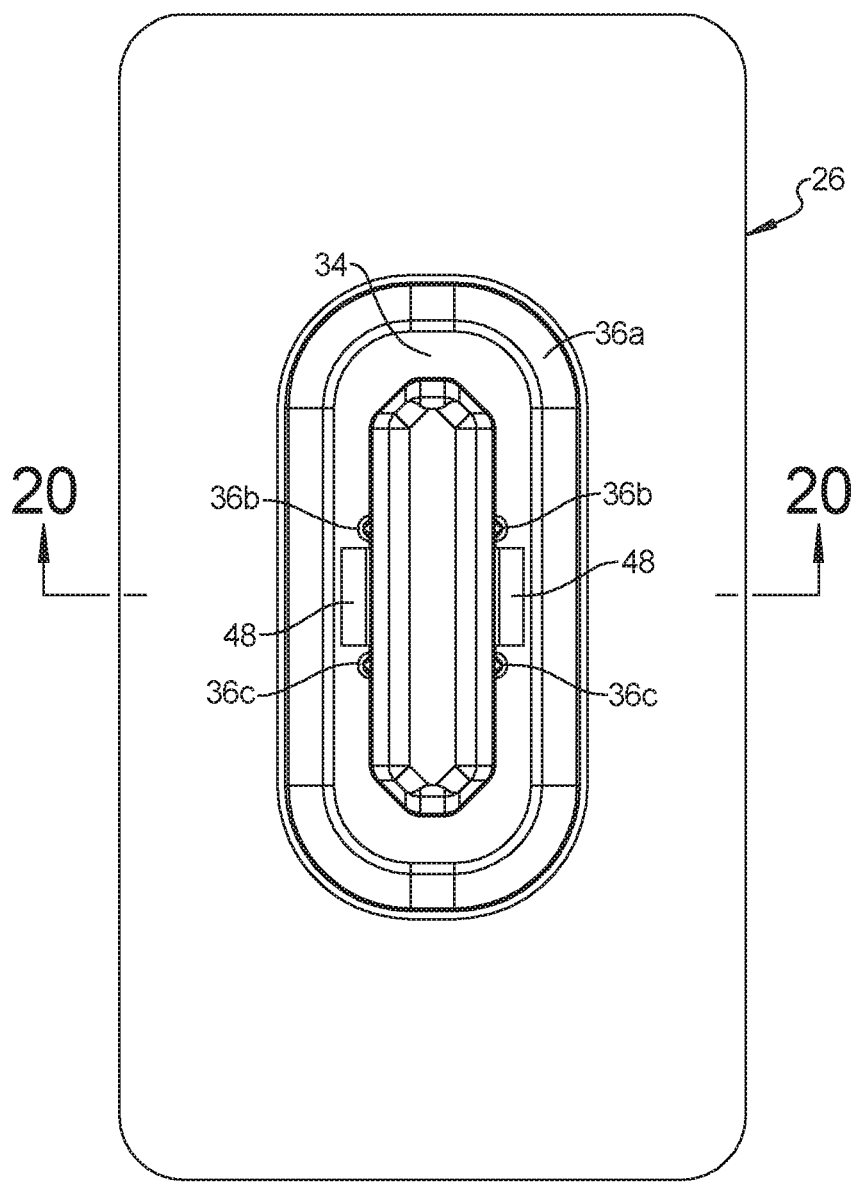
FIG. 18 is a bottom plan view of the example bathtub fastener assembly of FIG. 17, coupled to the ribbed component.
Figure 19:
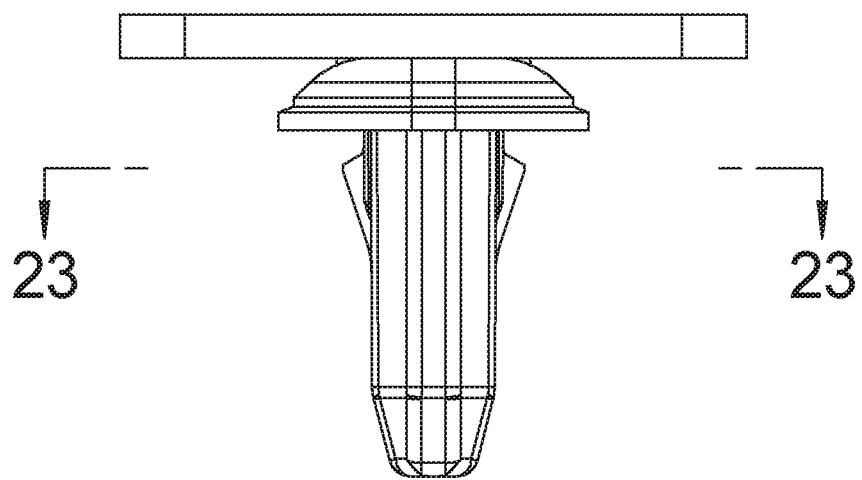
FIG. 19 is a side elevation view looking at a lateral end of the example bathtub fastener assembly of FIG. 17, coupled to the ribbed component.
Figure 20:
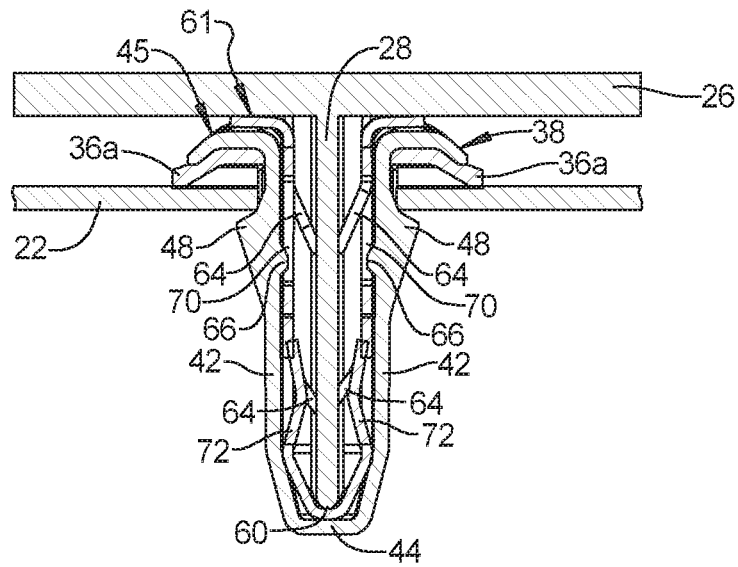
FIG. 20 is a cross-section view of the example bathtub fastener assembly of FIG. 17 taken along line 20-20 of FIG. 18, coupled to both the apertured and ribbed components.
Figure 21:
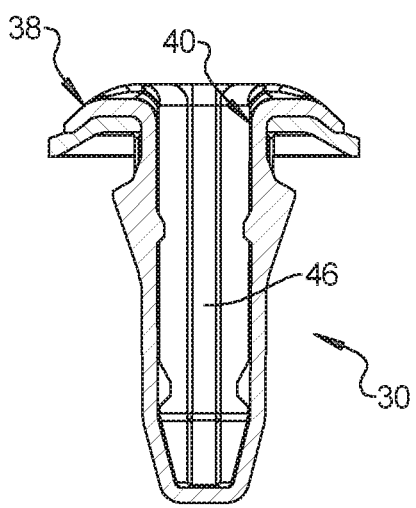
FIG. 21 is a cross-section view similar to FIG. 20, but showing only the bathtub component of FIG. 20.
Figure 22:
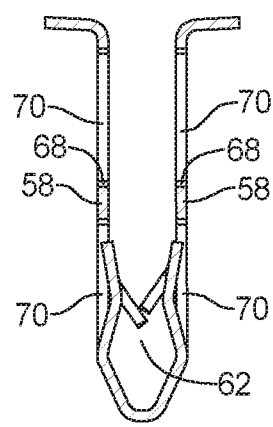
FIG. 22 is a cross-section view similar to FIG. 20, but showing only the U-base clip component of FIG. 20.
Figure 23:
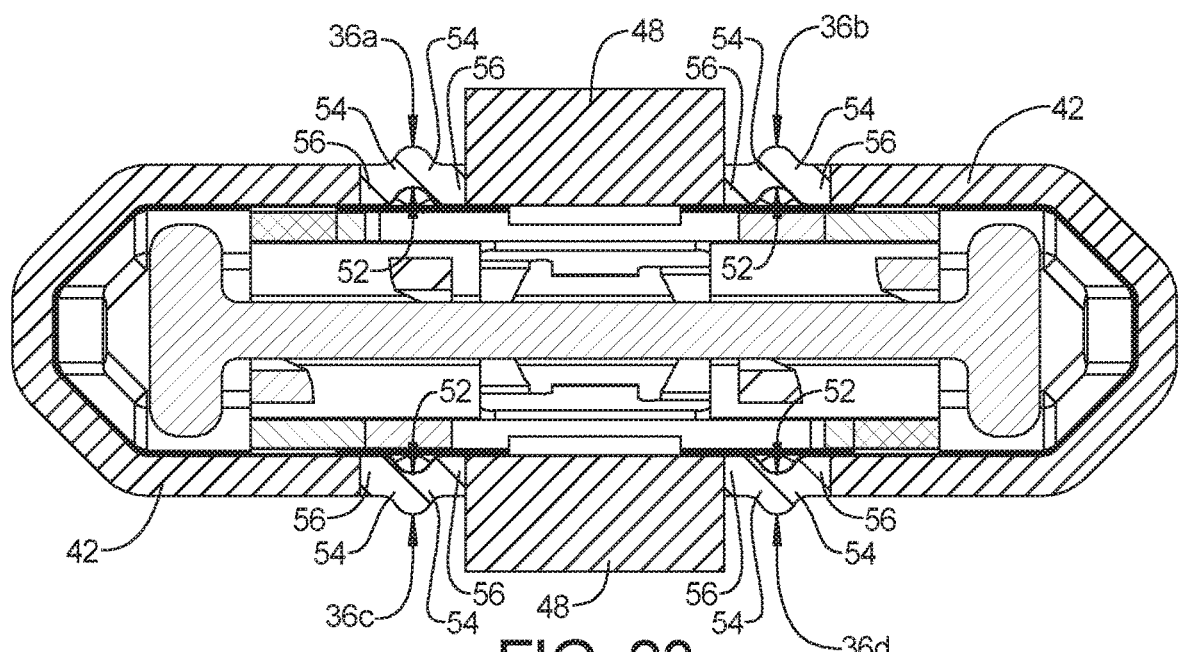
FIG. 23 is a cross-section view of the example bathtub fastener assembly of FIG. 17 taken along line 23-23 of FIG. 19.
Figure 24:
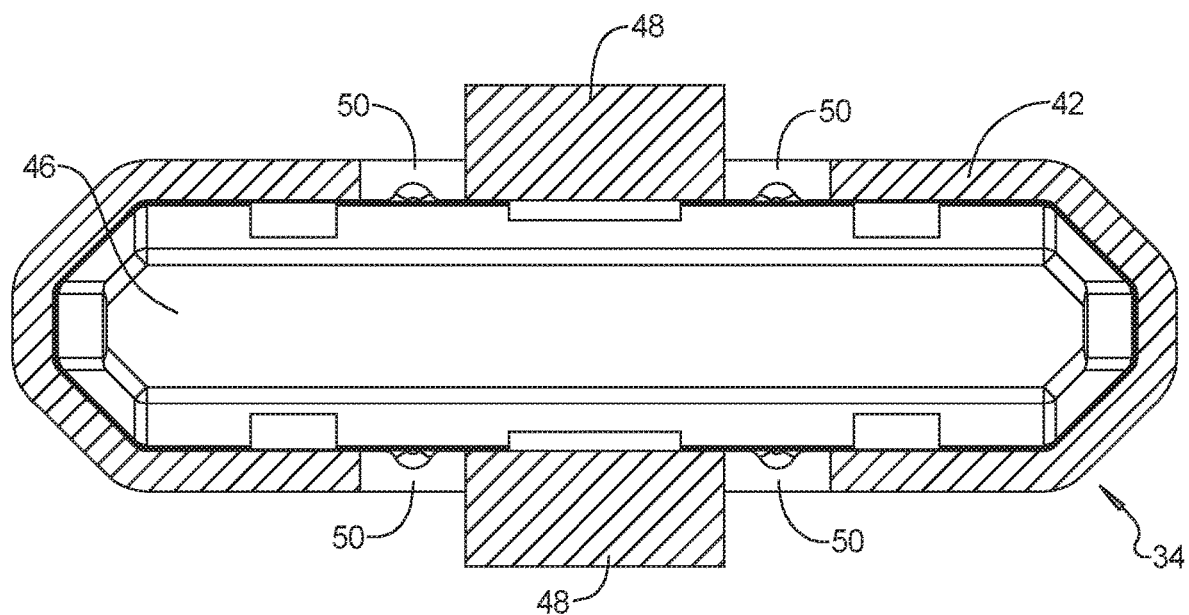
FIG. 24 is a cross-section view similar to FIG. 23, but showing only the structural plastic part of the bathtub component of FIG. 23.

The pair of separate flexible seal parts 36b, 36c that seal the openings 50, respectively, on the lateral sides of the retention tabs can have a central U-shaped portion 52 with a flange portion 56 extending outwardly from each leg 54 of the central U-shaped portion 52 perpendicular to the longitudinal insertion and removal direction as shown, e.g., along line 15-15 of FIG. 11, (referred to herein as a "flanged U-shape in cross-section"). As in this example, the U-shaped central portion 52 can comprise a dual U-shape (somewhat resembling an "X"). The flange portions 56 extending from the U-shaped central portion 52 of each of the separate flexible seal parts 36b, 36c can include planer portions. The flange portions 56, e.g., the planer portions, can extend at an angle with respect to each other, which can cause the cross-sectional flanged U-shape to have an overall W-shape.

As in this embodiment, a pair of clip retention protrusions 66 can extend into respective clip retention apertures 70 that provide the clip retention surfaces 68 and the clip retention protrusions 66 can extend into the clip retention apertures 70, and can further extend into the rib receiving cavity 62 of the U-base clip component 32 a distance of at least one thickness of the clip side walls 58. As in this embodiment, a pair of rib retention protrusions 64 can be positioned adjacent the tub trailing end 45 or the clip trailing end 61.

Referring to FIGS. 17-24, another example of a bathtub fastener assembly 20 in accordance with the present disclosure is illustrated and described herein. A rib support arm 72 can extend from each opposing side wall 58 adjacent the clip insertion end 60. The rib support arm 72 can be bent inwardly toward or into the rib receiving cavity 62. A rib retention protrusion 64 can be supported from adjacent a distal end of the rib support arm 72, and can extend therefrom inwardly into the rib receiving cavity 62. As in this example, each rib support arm 72 can support more than one, such as a pair, of rib retention protrusions 64.

As in this embodiment, a pair of rib retention protrusions 64 can be positioned adjacent the tub trailing end 45 or the clip trailing end 61. Additionally or alternatively, a pair of rib retention protrusions 64 can be positioned adjacent the tub insertion end 44 or clip insertion end 60. In addition, aperture retention tabs 48, clip retention protrusions, or both, can be positioned between a pair of rib retention protrusions 64 adjacent the tub insertion end 44 or clip insertion end 60 and a pair of rib retention protrusions 64 positioned adjacent the tub trailing end 45 or the clip trailing end 61.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A bathtub fastener assembly designed to couple a first component having an aperture therethrough to a second component having a rib extending therefrom, the bathtub fastener assembly comprising:

a bathtub component including a structural plastic part and a plurality of separate flexible seal parts, each of the separate flexible seal parts being integrated together with the structural plastic part;

the structural plastic part including a head and a tub body extending from the head, the tub body having two tub side walls connected at a tub insertion end with an interior clip receiving cavity between the two side walls, each of the two tub side walls having an aperture retention tab extending exteriorly therefrom and designed to retain the bathtub component in the aperture of the first component when inserted therein, the structural plastic part including openings on lateral sides of the aperture retention tabs designed to allow the aperture retention tabs to flex inwardly during insertion of the bathtub component into the aperture of the first component;

the plurality of separate flexible seal parts including a separate flexible seal part forming an umbrella seal extending from the head and a pair of separate flexible seal parts sealing the openings, respectively, on the lateral sides of the aperture retention tabs; and a U-base clip component including two clip side walls connected at a clip insertion end with a rib receiving cavity between the two clip side walls, and a rib retention protrusion extending interiorly from the two clip side walls into the rib receiving cavity and designed to retain the rib in the rib receiving cavity of the U-base clip when inserted therein, and the U-base clip component being received in the interior clip receiving cavity and being coupled to the bathtub component;

wherein the structural plastic part is formed of a structural clastic material, and the plurality of separate flexible seal parts are formed of a flexible seal material that is different from the structural plastic material.

2. The bathtub fastener assembly of claim 1, wherein the aperture retention tabs of the structural plastic part are connected to the tub side walls, respectively, at both an insertion end and a trailing end of the aperture retention tabs.

3. The bathtub fastener assembly of claim 1, wherein the pair of separate flexible seal parts sealing the openings have a flanged U-shape in cross-section.

4. The bathtub fastener assembly of claim 3, wherein flange portions of the flanged U-shape comprise planar flange portions aligned with each other.

5. The bathtub fastener assembly of claim 3, wherein flange portions of the flanged U-shape comprise flange portions angled relative to each other giving the flanged U-shape in cross section an overall W-shape.

6. The bathtub fastener assembly of claim 1, wherein the openings are positioned in the two tub side walls of the structural plastic part and are designed to allow the aperture retention tabs to flex inwardly relative to the tub side walls, respectively, during insertion of the bathtub component into the aperture of the first component.

7. The bathtub fastener assembly of claim 1, wherein the openings extend between the two tub side walls at lateral ends of the tub body of the structural plastic part, and are designed to allow the aperture retention tabs to flex inwardly along with the two tub side walls, respectively, during insertion of the bathtub component into the aperture of the first component.

8. The bathtub fastener assembly of claim 1, wherein the two clip side walls include clip retention apertures, and the two tub side walls include clip retention protrusions engaging the clip retention apertures, respectively, to couple the U-base clip received in the interior clip receiving cavity of the bathtub component.

9. The bathtub fastener assembly of claim 8, wherein the clip retention protrusions extend through the clip retention apertures, respectively, and into the rib retention cavity of the U-base clip.

10. The bathtub fastener assembly of claim 8, wherein the clip retention protrusions extend from the two tub side walls opposite the aperture retention tabs, respectively.

11. The bathtub fastener assembly of claim 1, wherein the rib retention protrusion is a rib retention barb.

12. The bathtub fastener assembly of claim 11, wherein a barb support arm extends from each side wall and the rib retention barb extends from adjacent a distal end of the barb support arm.

13. A bathtub fastener assembly designed to couple a first component having an aperture therethrough to a second component having a rib extending therefrom, the bathtub fastener assembly comprising:

a bathtub component including a structural plastic part and a plurality of separate flexible seal parts, each of the flexible seal parts being separately integrated together with the structural plastic part;

the structural plastic part including a head and a tub body extending from the head, the tub body having two tub side walls connected at a tub insertion end with an interior clip receiving cavity between the two tub side walls, each of the two tub side walls having an aperture retention tab extending exteriorly therefrom and designed to retain the bathtub component in the aperture of the first component when inserted therein, the aperture retention tabs of the structural plastic part being connected to the tub side walls, respectively, at both an insertion end and a trailing end of the aperture retention tabs, the structural plastic part including openings in the two tub side walls and on lateral sides of the aperture retention tabs designed to allow the aperture retention tabs to flex inwardly relative to the tub side walls, respectively, during insertion of the bathtub component into the aperture of the first component, and clip retention protrusions extending from the two tub side walls into the interior clip receiving cavity;

the plurality of separate flexible seal parts including a separate flexible seal part forming an umbrella seal extending from the head and a pair of separate flexible seal parts sealing the openings, respectively, on the lateral sides of each of the aperture retention tabs; and a U-base clip component including two clip side walls connected at a clip insertion end with a rib receiving cavity between the two clip side walls, and rib retention barbs extending interiorly from the two clip side walls into the rib receiving cavity and designed to retain the rib in the rib receiving cavity of the U-base clip when inserted therein, and the two clip side walls of the U-base clip including clip retention apertures cooperating with the clip retention protrusions to couple the U-base clip within the clip receiving cavity to the bathtub component;

wherein the structural plastic part is formed of a structural clastic material, and the plurality of separate flexible seal parts are formed of a flexible seal material that is different from the structural plastic material.

14. The bathtub fastener assembly of claim 13, wherein the clip retention protrusions extend from the two tub side walls opposite the aperture retention tabs, respectively.

15. The bathtub fastener assembly of claim 13, wherein a first pair of the clip retention protrusions extend from the two tub side walls opposite the aperture retention tabs, respectively, and a second pair of the clip retention protrusions are positioned adjacent the tub insertion end.

16. The bathtub fastener assembly of claim 15, wherein the rib retention barbs are positioned between the first and second pairs of clip retention protrusions.

17. The bathtub fastener assembly of claim 13, wherein the rib retention barbs are positioned adjacent a trailing tub end.

18. The bathtub fastener assembly of claim 13, wherein a first pair of the rib retention barbs are positioned adjacent a trailing tub end, and a second pair of the rib retention barbs are positioned adjacent the insertion tub end.

19. The bathtub fastener assembly of claim 18, wherein the clip retention protrusions are positioned between the first and second pairs of the rib retention barbs.

20. The bathtub fastener assembly of claim 19, wherein the clip retention protrusions extend from the two tub side walls opposite the aperture retention tabs, respectively.

* * * * *

UNITED STATES PATENT AND TRADEMARK OFFICE
CERTIFICATE OF CORRECTION

PATENT NO. : 11,149,774 B2  
APPLICATION NO. : 16/592307  
DATED : October 19, 2021  
INVENTOR(S) : Malek et al.

It is certified that error appears in the above-identified patent and that said Letters Patent is hereby corrected as shown below:

In the Claims

In Column 7, Line 41, In Claim 1, delete "clastic" and insert --plastic-- therefor.

In Column 9, Line 2, In Claim 13, delete "clastic" and insert --plastic-- therefor.

Signed and Sealed this  
Fifteenth Day of February, 2022

Drew Hirshfeld  
*Performing the Functions and Duties of the*  
*Under Secretary of Commerce for Intellectual Property and*  
*Director of the United States Patent and Trademark Office*